United States Patent
Breen et al.

(10) Patent No.: US 7,756,253 B2
(45) Date of Patent: Jul. 13, 2010

(54) METHODS AND SYSTEMS FOR PROVIDING FOREIGN CALL BACK NUMBER COMPATIBILITY FOR VOIP E9-1-1 CALLS

(75) Inventors: Thomas P. Breen, Snellville, GA (US); Anne-Marie B. Darr, Alpharetta, GA (US)

(73) Assignee: AT&T Intellectual Property II, LP, Reno, NV (US)

( * ) Notice: Subject to any disclaimer, the term of this patent is extended or adjusted under 35 U.S.C. 154(b) by 1343 days.

(21) Appl. No.: 11/222,068

(22) Filed: Sep. 8, 2005

(65) Prior Publication Data

US 2006/0188083 A1   Aug. 24, 2006

Related U.S. Application Data

(60) Provisional application No. 60/657,560, filed on Feb. 28, 2005, provisional application No. 60/655,230, filed on Feb. 22, 2005.

(51) Int. Cl.
*H04M 11/04* (2006.01)
(52) U.S. Cl. .................. 379/45; 379/142.1; 379/207.12; 379/211.02; 455/521; 455/404.2
(58) Field of Classification Search .............. 455/404.1, 455/404.2, 521; 370/352; 379/45, 142.1, 379/201.06, 207.12, 211.02, 211.01
See application file for complete search history.

(56) References Cited

U.S. PATENT DOCUMENTS

| | | | |
|---|---|---|---|
| 6,940,950 B2 * | 9/2005 | Dickinson et al. | 379/45 |
| 7,079,627 B2 * | 7/2006 | Crago et al. | 379/45 |
| 7,251,317 B1 * | 7/2007 | Robbins et al. | 379/114.21 |
| 7,260,186 B2 * | 8/2007 | Zhu et al. | 379/45 |
| 2003/0123636 A1 * | 7/2003 | Bigelow | 379/220.01 |
| 2004/0190497 A1 * | 9/2004 | Knox | 370/352 |
| 2005/0249193 A1 * | 11/2005 | Epley | 370/352 |
| 2006/0245570 A1 * | 11/2006 | Pfleging et al. | 379/211.02 |
| 2007/0147345 A1 * | 6/2007 | Lowmaster | 370/352 |
| 2007/0259645 A1 * | 11/2007 | Laliberte | 455/404.2 |

* cited by examiner

*Primary Examiner*—Olisa Anwah
(74) *Attorney, Agent, or Firm*—Akerman Senterfitt LLP; Michael K. Dixon; Paul F. Neils (57) ABSTRACT

Systems and methods provide foreign call back number compatibility. The systems and methods receive a local telephone number assigned to a subscriber, the subscriber having a non-local telephone number as the normal calling number of the subscriber. Furthermore, the systems and methods query a database with the local telephone number to obtain the non-local telephone number and to provide the non-local telephone number. In addition, systems and methods provide a foreign call back number compatibility database. The systems and methods receive a local telephone number assigned to a subscriber and a non-local telephone number comprising the normal calling number of the subscriber and saving the local number and the non-local number to a database.

32 Claims, 3 Drawing Sheets

METHODS AND SYSTEMS FOR PROVIDING FOREIGN CALL BACK NUMBER COMPATIBILITY FOR VOIP E9-1-1 CALLS

RELATED APPLICATION

Under provisions of 35 U.S.C. §119(e), the Applicants claim the benefit of U.S. Provisional Application No. 60/657,560, filed Feb. 28, 2005, entitled "METHODS AND SYSTEMS FOR FOREIGN CALL BACK NUMBER COMPATIBILITY FOR VOIP E 9-1-1 CALLS" and U.S. Provisional Application No. 60/655,230, filed Feb. 22, 2005, entitled "GEOGRAPHIC REDUNDANCY OR BACK UP SWITCH", both of which are incorporated herein by reference.

BACKGROUND OF THE INVENTION

I. Field of the Invention

The present invention generally relates to methods and systems for providing foreign call back number compatibility, for example, for VoIP users who place calls from a static location, where the service was initially installed by the service provider. More particularly, the present invention relates to providing foreign call back number compatibility for voice-over-internet-protocol E9-1-1 calls.

II. Background Information

The internet has become a mainstream network for communicating not just data, such as email and pictures, but also for providing real-time bi-directional voice communications. Voice-over-internet-protocol (VoIP) is an industry standard that has evolved to enable users to place telephone calls through the internet, instead of through the public switched telephone network (PSTN). A conventional telephone may now be connected to the internet using an interface device that converts analog telephone signals to digital signals that can be communicated through the internet. A telephone call may be communicated through the internet to a VoIP provider, who converts the call back to an analog signal and places the call through a PSTN that is local to the called telephone. Accordingly, a user can dial a telephone number in a conventional manner and have the call routed through the internet, instead of through a PSTN.

Some telephone services, however, may only be available to users who make calls through a PSTN, and may not be available if the calls are made through the internet. For example, when a user places a call to an emergency number, such as a "911" call, through a PSTN, the emergency call may be routed to a public safety answering point (PSAP). The caller's location and the calling telephone's number may be automatically communicated to a PSAP technician, who may then route the call to the proper emergency service provider.

Users who subscribe to VoIP services may elect to be assigned a telephone number that is not local to that user's local geographic rate center (e.g., a non-local telephone number or a foreign call back number.) For example, a user who resides in Atlanta, Ga., may elect to have a telephone number that is local to Chicago, Ill. Accordingly, such a VoIP telephone number may not be able to be forwarded directly to the PSAP that is normally associated with the caller's location, and/or it may not provide useful information on the caller's location if it were able to be forwarded directly to the PSAP.

In view of the foregoing, there is a need for methods and systems for providing foreign call back number compatibility more optimally. Furthermore, there is a need for providing foreign call back number compatibility for VoIP E9-1-1 calls.

SUMMARY OF THE INVENTION

Consistent with embodiments of the present invention, systems and methods are disclosed for providing foreign call back number compatibility, for example, for VoIP users who place calls from a static location, where the service was initially installed by the service provider.

In accordance with one embodiment, a method for providing foreign call back number compatibility comprises assigning a non-local telephone number to a subscriber, assigning a local telephone number to a subscriber, and providing periodically both the non-local telephone number and the local telephone number associated with the subscriber.

According to another embodiment, a computer-readable medium which stores a set of instructions which when executed performs a method for providing a foreign call back number compatibility database, the method comprising assigning a non-local telephone number to a subscriber, assigning a local telephone number to a subscriber, and providing periodically both the non-local telephone number and the local telephone number associated with the subscriber.

In accordance with yet another embodiment, a method for providing foreign call back number compatibility comprises receiving a local telephone number assigned to a subscriber, the subscriber having a non-local telephone number as the normal calling number of the subscriber, querying a database with the local telephone number to obtain the non-local telephone number, and providing the non-local telephone number. Normal calling number may describe a number that the caller would consider to be their telephone number, as opposed to another "local" number that may only be used for routing an E9-1-1 call, for example.

In accordance with yet another embodiment, a system for providing foreign call back number compatibility comprises means for receiving a local telephone number assigned to a subscriber, the subscriber having a non-local telephone number as the normal calling number of the subscriber, means for querying a database with the local telephone number to obtain the non-local telephone number, and means for providing the non-local telephone number.

In accordance with yet another embodiment, a computer-readable medium which stores a set of instructions which when executed performs a method for providing a foreign call back number compatibility database, the method comprising receiving a local telephone number assigned to a subscriber, the subscriber having a non-local telephone number as the normal calling number of the subscriber, querying a database with the local telephone number to obtain the non-local telephone number, and providing the non-local telephone number.

In accordance with yet another embodiment, a method for providing foreign call back number compatibility comprises maintaining a database comprising a plurality of local telephone numbers, associating one of the plurality of local telephone numbers with a subscriber having a non-local telephone number as a normal calling number, and providing periodically the non-local telephone number and the one of the plurality of local telephone numbers associated with the subscriber.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings, which are incorporated in and constitute a part of this disclosure, illustrate various embodiments and aspects of the present invention. In the drawings.

DETAILED DESCRIPTION

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering or adding steps to the disclosed methods. Accordingly, the following detailed description does not limit the invention. Instead, the proper scope of the invention is defined by the appended claims.

Systems and methods consistent with embodiments of the present invention provide foreign call back number compatibility for VoIP E9-1-1 calls. Consistent with embodiments of the present invention, when a telephone call is made to an emergency telephone number (e.g. "911") from a non-local telephone number, a local telephone number is assigned to the telephone call as the calling telephone number. The telephone call is then routed, based on the local telephone number, to a portion of a public safety system that services the subscriber's local area (i.e., the local number's area). The subscriber's location is automatically retrieved and used by an emergency technician. Accordingly, a VoIP subscriber may call an emergency number from a non-local packet-switched telephone number, but have the emergency call routed to a local public safety system with the subscriber's location information being retrieved automatically. Furthermore, consistent with embodiments of the present invention, the subscriber's (the caller's) non-local packet-switched telephone number is also presented to the emergency technician.

An embodiment consistent with the invention comprises a system for providing foreign call back number compatibility. The system comprises a memory storage for maintaining a database and a processing unit coupled to the memory storage. The processing unit is operative to receive a local telephone number assigned to a subscriber, the subscriber having a non-local telephone number as the normal calling number of the subscriber. Furthermore, the processing unit is operative to query a database with the local telephone number to obtain the non-local telephone number and to provide the non-local telephone number.

Another embodiment consistent with the invention comprises a system for providing a foreign call back number compatibility database. The system comprises a memory storage for maintaining a database and a processing unit coupled to the memory storage. The processing unit is operative to receive a local telephone number assigned to a subscriber and a non-local telephone number comprising the normal calling number of the subscriber. In addition, the processing unit is operative to save the local number and the non-local number to a database.

Figure 1:
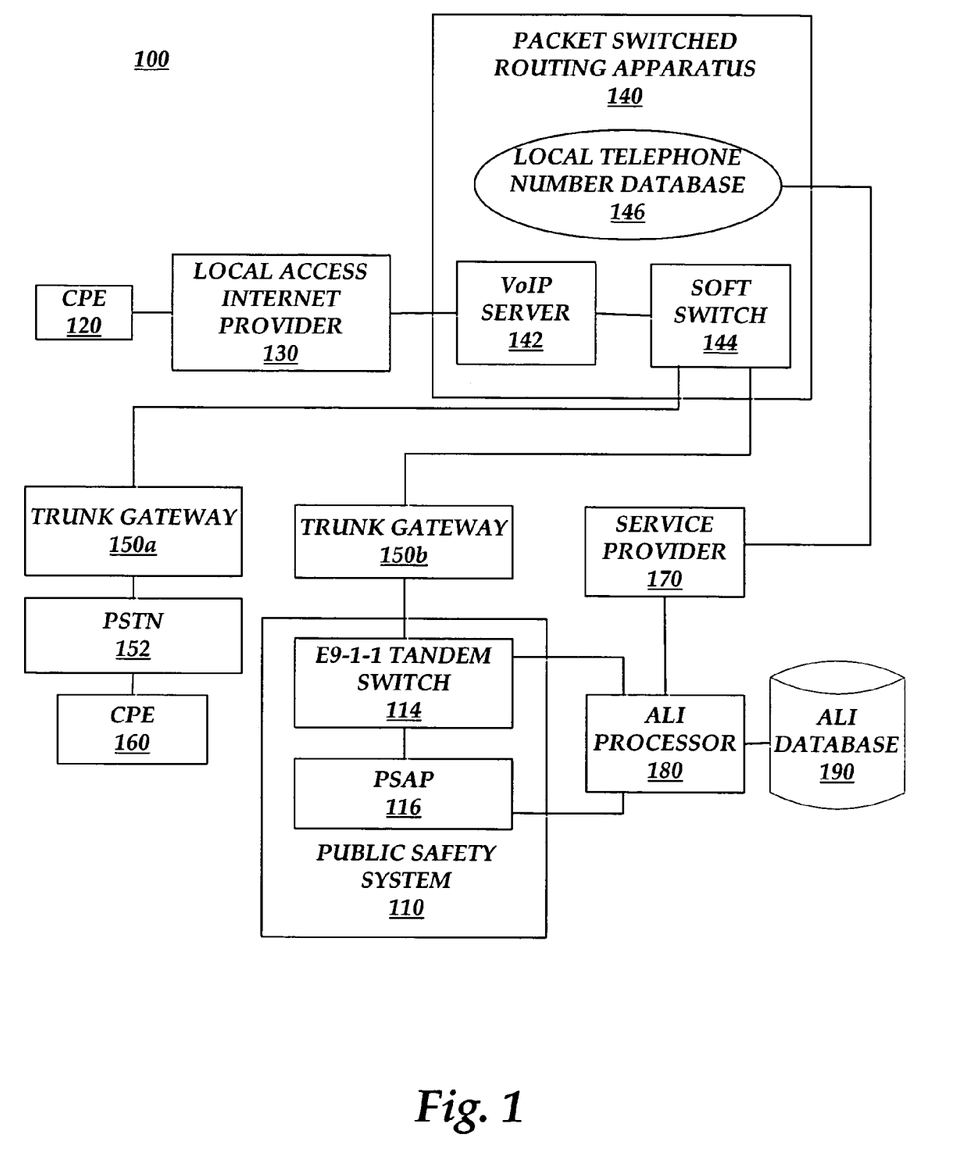
FIG. 1 is a block diagram of an exemplary packet-switched telephone system consistent with an embodiment of the present invention.

Consistent with an embodiment of the present invention, the aforementioned memory, processing unit, and other components are implemented in a packet-switched telephone system, such as an exemplary packet-switched telephone system 100 of FIG. 1. Any suitable combination of hardware, software and/or firmware may be used to implement the memory, processing unit, or other components. By way of example, the memory, processing unit, or other components may be implemented within an automatic location information (ALI) processor 180 shown in system 100. The aforementioned system and processors are exemplary and other systems and processors (shown in FIG. 1 or not) may comprise the aforementioned memory, processing unit, or other components, consistent with embodiments of the present invention.

By way of a non-limiting example, FIG. 1 illustrates the packet-switched telephone system 100 that, for example, routes telephone calls through a network (such as a packet-switched network) from consumer premises equipment (CPE) 120 to a public safety system 110 according to embodiments of the present invention. The network may include, for example, a packet-switched routing apparatus 140. System 100 includes a local access internet provider 130, packet-switched routing apparatus 140, trunk gateways 150a and 150b, CPE 160, a service provider 170, ALI processor 180, and an ALI database 190, for example. Public safety system 110 comprises an E9-1-1 Tandem Switch 114 and a PSAP 116.

Packet-switched routing apparatus 140 comprises a VoIP server 142, a soft switch 144, and a local telephone number database 146. VoIP server 142 may be, for example, a BroadWorks platform by BroadSoft, and includes subscriber information used for routing calls to/from subscribers. Soft switch 144 may be, for example, a Siemens hiQ 8000 Softswitch, and may provide a bridge between the internet and trunk gateways 150a, 150b, and/or other equipment in PSTN 152. VoIP server 142 and/or soft switch 144 may perform one or more operations for checking whether a called telephone number corresponds to a predetermined number, determining whether the calling telephone number is local to a subscriber, and/or associating a local telephone number with a telephone call. VoIP server 142 and/or soft switch 144 may associate a local telephone number and a packet-switched telephone number with a subscriber, and route a telephone call with the local telephone number or with the packet-switched telephone number as a calling telephone number based on whether the called telephone number corresponds to a predetermined number. The local telephone numbers and a packet-switched telephone numbers associated with subscribers are retained in local telephone number database 146 that can be queried, or otherwise accessed, by the VoIP server 142 and/or soft switch 144.

CPE 160 may be a conventional plain old telephone system (POTS) telephone. Service provider 170 may comprise a VoIP service provider such as Vonage Inc., of Edison, N.J. Furthermore, service provider 170 may comprise a competitive local exchange carrier (CLEC). The aforementioned are exemplary, and system 100 may include other elements.

System 100 allows telephone calls to be initiated and/or received via CPE 120 through the packet switched network comprising, for example, the internet. Telephone calls initiated and/or received this way, for example, may comprise VoIP telephone calls. CPE 120 may be a computer with a microphone, speaker, and software that is configured to convert voice to/from a digital format that can be routed through the Internet. Furthermore, CPE 120 may be a conventional telephone (e.g. a POTS telephone) that is connected through a VoIP access device to the internet. The aforementioned are exemplary, and CPE 120 may comprise other elements.

Local access internet provider 130 provides a local interface between CPE 120 and packet switched routing apparatus 140. Local access internet provider 130 may comprise, for example, a local telephone company that provides access to, for example, the internet through a dial-up connection and/or through a digital subscriber line (DSL).). Moreover, local access internet provider 130 may comprise, for example, a cable TV/communications company that provides a cable modem connection to the internet. Furthermore, local access internet provider 130 may comprise a wireless operator that provides, for example, cellular data communications or wireless fidelity (WiFi) communications to the internet over a wireless interface. The aforementioned are exemplary, and local access internet provider 130 may comprise other types of service providers.

To setup VoIP services, a subscriber, for example, registers with service provider 170 and is assigned one or more packet-switched telephone numbers. The packet-switched telephone number comprises the telephone number that others may dial to call the subscriber. The subscriber may request packet switched telephone numbers that are local to the subscriber (e.g., the number is local to the subscriber's local geographic rate center). The subscriber, however, may request packet switched telephone numbers that are not local to the subscriber (i.e., foreign). For example, the subscriber may reside in Atlanta, Ga., and may, for example, request packet switched telephone numbers that are local to New York City, N.Y. and to Macon, Ga., both of which are not local to the subscriber's Atlanta, Ga. location.

When the subscriber requests non-local telephone numbers, the subscriber is also assigned a local telephone number (assigned local telephone number) that may be associated with the subscriber's location. For example, the assigned local telephone number comprises a telephone number having an area code and/or other prefix that is associated with the subscriber's local geographic rate center, such as Atlanta, Ga. For example, when the subscriber does not request a local packet switched telephone number, service provider 170 looks-up an available local telephone number and assigns it to the subscriber. Service provider 170, for example, may not make the subscriber aware of the assigned local telephone number. Moreover, service provider 170, for example, may take steps to prevent the assigned local telephone number from being used by any subscriber to initiate or terminate telephone calls.

The assigned local telephone number may not be a callable telephone number, for example, it may be a telephone number that may be reserved or otherwise not usable for placing a call to or from the subscriber's location.

The subscriber's location (e.g., street address and/or GPS coordinates) and the assigned local telephone number are provided to public safety system 110. Public safety system 110 stores the local telephone number and location in ALI database 190. ALI database 190 may be, for example, a database that is presently available from Intrado Inc. Moreover, ALI database 190 may be updated periodically by service provider 170 as described below, for example, with respect to FIG. 2 below.

In an alternative embodiment, if ALI database 190 is centrally located, then PSAP 116 may not store the number and/or location information in ALI database 190. PSAP 116 may merely retrieve this information from ALI database 190. ALI database 190 manager/owner, such as a service provider, may be the party that stores the number and location information.

Packet-switched routing apparatus 140 routes telephone calls based on the called telephone number (i.e., the telephone number to which the call is directed). For example, it may route a telephone call from CPE 120 through trunk gateway 150a and PSTN 152 to CPE 160.

When the called telephone number is a predetermined number, such as "911" or another emergency number, however, packet-switched routing apparatus 140 determines whether the calling telephone number (i.e., the telephone number from which the call originated) is local to the subscriber and, if it is local, it routes the telephone call with the calling telephone number. When the calling telephone number is not local to the subscriber, the packet switched routing apparatus 140 associates the assigned local telephone number for the subscriber with the telephone call and routes the telephone call using the assigned local telephone number. In this case, the assigned local telephone number is substituted for, and used as, the calling telephone number associated with the telephone call.

When the called telephone number is a predetermined number as described above, packet switched routing apparatus 140 routes the telephone call. This routing is based on the called telephone number (e.g. "911") and the calling telephone number (which may comprise the assigned local telephone number if the subscriber requested a non-local telephone number) through trunk gateway 150b to a portion of public safety system 110 that services the subscriber's local area. The telephone call is routed in public safety system 110 through E9-1-1 tandem switch 114 that obtains routing information from a Selective Routing database that may be co-located with the E9-1-1 Tandem switch, or co-located with ALI database 190. The telephone call is then routed to PSAP 116 that services the subscriber's local area. PSAP 116 obtains the subscriber's location information from the ALI database 190 based on the calling telephone number (which may comprise the assigned local telephone number if the subscriber requested a non-local telephone number) that allows emergency personnel to determine the location of the caller.

CPE 120, CPE 160, ALI processor 180 or other elements ("the processors") included in system 100 may be implemented using a personal computer, network computer, mainframe, or other similar microcomputer-based workstation. The processors may comprise any type of computer operating environment, such as hand-held devices, multiprocessor systems, microprocessor-based or programmable sender electronic devices, minicomputers, mainframe computers, and the like. The processors may also be practiced in distributed computing environments where tasks are performed by remote processing devices. Furthermore, any of the processors may comprise a mobile terminal, such as a smart telephone, a cellular telephone, a cellular telephone utilizing wireless application protocol (WAP), personal digital assistant (PDA), intelligent pager, portable computer, a hand held computer, a conventional telephone, or a facsimile machine. The aforementioned systems and devices are exemplary and the processor may comprise other systems or devices.

The network, as referred to above, may comprise, for example, a local area network (LAN) or a wide area network (WAN). Such networking environments are commonplace in offices, enterprise-wide computer networks, intranets, and the Internet. When a LAN is used as the network, a network interface located at any of the processors may be used to interconnect any of the processors. When the network is implemented in a WAN networking environment, such as the Internet, the processors may typically include an internal or external modem (not shown) or other means for establishing communications over the WAN. Further, in utilizing the network, data sent over the network may be encrypted to insure data security by using known encryption/decryption techniques.

In addition to utilizing a wire line communications system as the network, a wireless communications system, or a combination of wire line and wireless may be utilized as the network in order to, for example, exchange web pages via the Internet, exchange e-mails via the Internet, or for utilizing other communications channels. Wireless can be defined as radio transmission via the airwaves. However, it may be appreciated that various other communication techniques can be used to provide wireless transmission, including infrared line of sight, cellular, microwave, satellite, packet radio, and spread spectrum radio. The processors in the wireless environment can be any mobile terminal, such as the mobile terminals described above. Wireless data may include, but is not limited to, paging, text messaging, e-mail, Internet access and other specialized data applications specifically excluding or including voice transmission. For example, CPEs 120 and 160 may communicate with local access internet provider 130 and/or a packet switched routing apparatus across a wireless interface such as, for example, a cellular interface (e.g., general packet radio system (GPRS), enhanced data rates for global evolution (EDGE), global system for mobile communications (GSM)), a wireless local area network interface (e.g., WLAN, IEEE 802.11), a bluetooth interface, another RF communication interface, and/or an optical interface.

Although FIG. 1 illustrates an exemplary system 100, embodiments of the present invention are not limited to such a configuration, and may encompass any configuration capable of carrying out the operations described. For example, although only two CPEs (120 and 160) and two trunk gateways (150*a* and 150*b*) have been shown, packet switching routing apparatus 140 may route telephone calls to/from thousands of VoIP subscribers through numerous trunk gateways. Moreover, although system 100 has been described in the context of the internet, it may be used to route telephone calls through any network, packet switched, or otherwise.

System 100 may also transmit data by methods and processes other than, or in combination with, the network. These methods and processes may include, but are not limited to, transferring data via, flash memory sticks diskette, CD ROM, facsimile, conventional mail, an interactive voice response system (IVR), or via voice over the PSTN.

Figure 2:
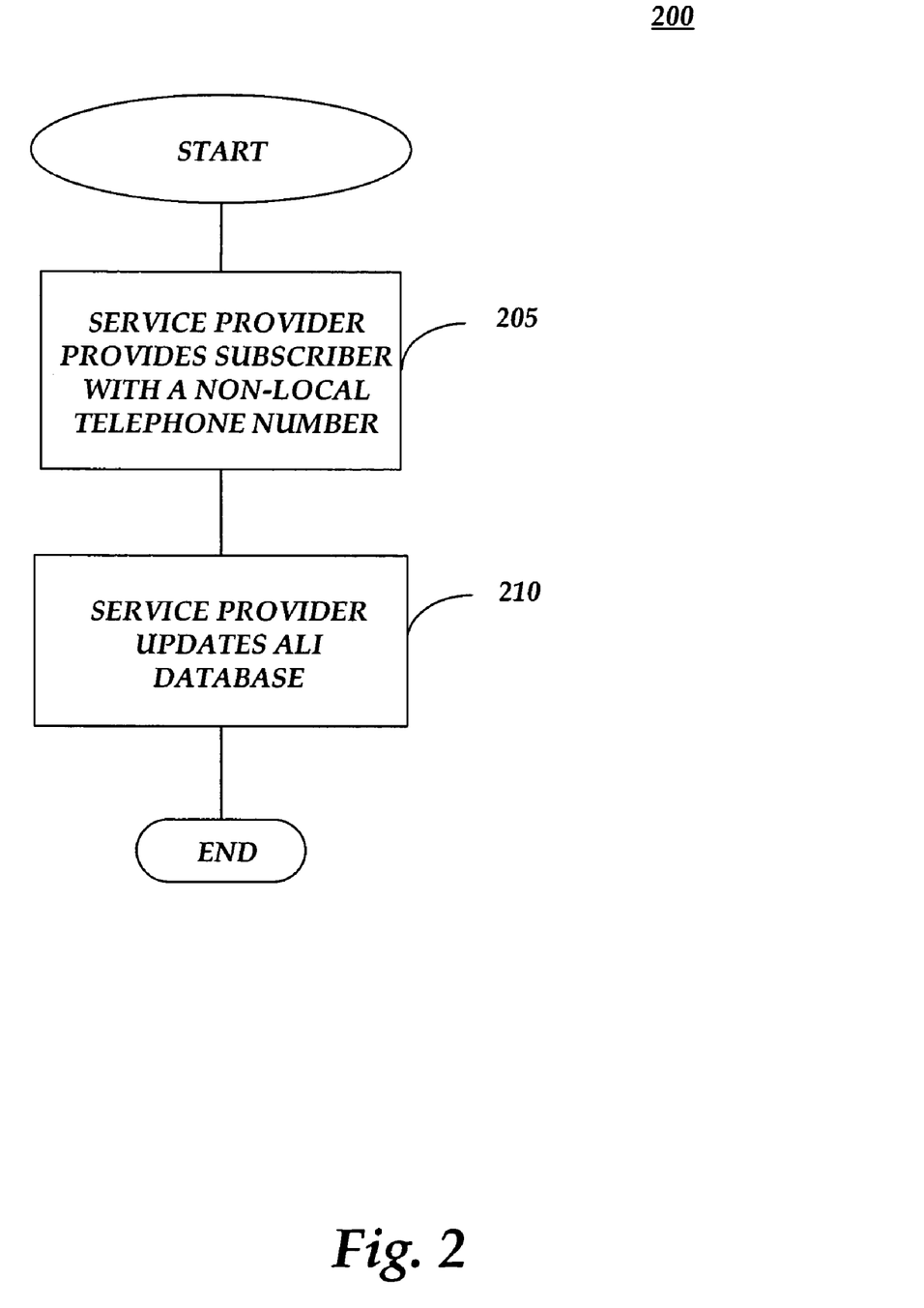
FIG. 2 is a flow chart of an exemplary method for providing a foreign call back number compatibility database consistent with an embodiment of the present invention.

FIG. 2 is a flow chart setting forth the general stages involved in an exemplary method 200 consistent with an embodiment of the invention for providing a foreign call back number compatibility database using system 100 of FIG. 1. Exemplary ways to implement the stages of method 200 will be described in greater detail below. Exemplary method 200 begins at a starting block and then service provider 170 provides the subscriber with a non-local telephone number as described above (stage 205).). For example, to setup VoIP services, the subscriber registers with service provider 170 and is assigned one or more packet-switched telephone numbers. The packet-switched telephone number comprises the telephone number that others may dial to call the subscriber. The subscriber may request packet-switched telephone numbers that are local to the subscriber and/or that are not local to the subscriber as described above.

When the subscriber requests non-local telephone numbers, the subscriber is also assigned, as described above, a local telephone number that is associated with the subscriber's location. In this case, service provider 170 accesses ALI processor 180, which in turn updates ALI database 190 with at least the assigned local telephone number and the assigned packet-switched telephone number (i.e. the others would use to call the subscriber number) (stage 210). ALI processor 180 places the packet-switched telephone number in a remote call-forwarding field (RCF) in ALI database 190.

Figure 3:
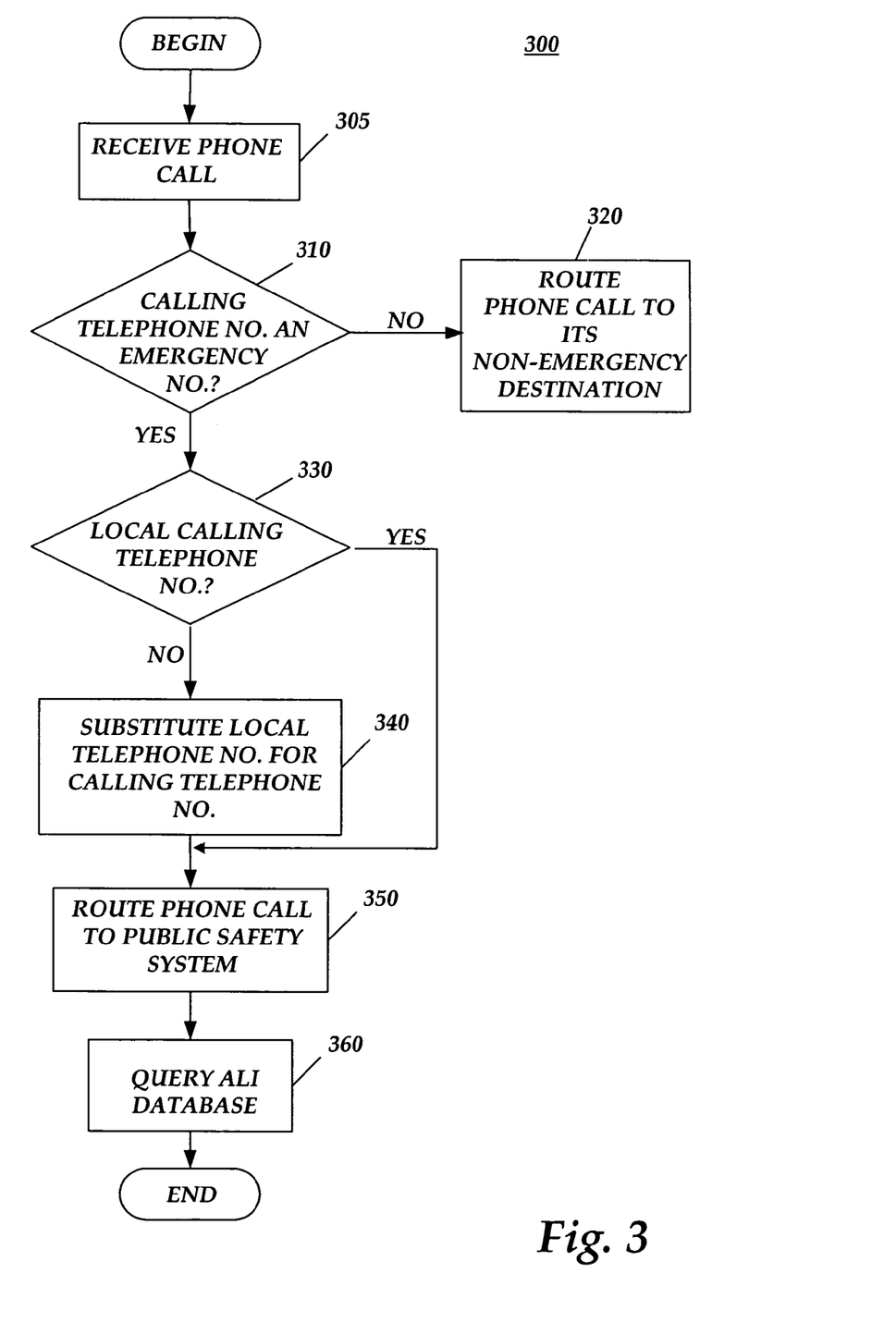
FIG. 3 is a flow chart of an exemplary method for providing foreign call back number compatibility consistent with an embodiment of the present invention.

FIG. 3 is a flow chart setting forth the general stages involved in another exemplary method 300 consistent with the invention for providing foreign call back number compatibility using system 100 of FIG. 1. Exemplary ways to implement the stages of method 300 will be described in greater detail below. Exemplary method 300 begins at a starting block and then packet switched routing apparatus 140 receives a telephone call (stage 305). Packet-switched routing apparatus 140 determines whether the called telephone number corresponds to an emergency number (e.g., "911") (stage 310). If the called telephone number does not correspond to an emergency number, packet-switched routing apparatus 140 routes the call based on the called telephone number to its non-emergency destination (stage 320).

When the called telephone number corresponds to an emergency number, packet switched routing apparatus 140 determines whether the calling telephone number is local to the subscriber who is associated with the telephone call (stage 330). If packet-switched routing apparatus 140 determines that the calling telephone number is local to the subscriber, then packet-switched routing apparatus 140 routes the call based on the calling telephone number and the called telephone number to a public safety system that services the geographic area of the subscriber (stage 350).

If packet-switched routing apparatus 140 determines the calling telephone number is non-local (stage 330), then an assigned local telephone number is substituted for the calling telephone number (stage 340). The substituted local telephone number may be another telephone number that was requested by the subscriber, such as when a VoIP subscriber requests a local packet switched telephone number and one or more non-local packet switched telephone numbers, or it may be a local telephone number that was assigned to the subscriber by, for example, service provider 170. Then packet-switched routing apparatus 140 substitutes the local telephone number for the calling telephone number (stage 340). Packet-switched routing apparatus 140 then routes the substituted local telephone number to the public safety system that services the subscriber's geographic area. The correct public safety system (e.g. public safety system 110) that services the subscriber's geographic area is determined based on the substituted calling telephone number (stage 350).

Once packet-switched routing apparatus 140 routes the substituted local telephone number to the correct public safety system (e.g. public safety system 110) that services the subscriber's geographic area, PSAP 116 queries ALI database 190 through ALI processor 180 (stage 360). PSAP 116 queries ALI database 190 using the substituted local telephone number. In response to this query, ALI database 190 returns the packet-switched telephone number that others may dial to call the subscriber. This number returned by ALI database 190 was previously stored in the ALI database 190 by service provider 170, for example, as described above with respect to FIG. 2.

PSAP 116 displays the packet-switched telephone number that others may dial to call the subscriber to a technician in an Alternate Number field viewable by the technician. The Alternate Number field (e.g. ALT#) is a data field that is used by E9-1-1 ALI databases to display what may be referred to as the "real call back number" to the PSAP call taker/technician(s). It is used to display the actual handset telephone number of a wireless caller when they make a 9-1-1 call that is on a wireless network capable of providing E9-1-1 compliant services. As a result of this field being used to indicate the "real call back number" on a wireless call, the technician would also be trained to use the number appearing in the ALT# field as the one they should use to place a call to the caller should the need arise after the initial VoIP call, for example, has terminated. For example, the technician knows that the number in the Alternate Number field is a number that others may dial to call the subscriber. Furthermore, because a number is present in the Alternate Number field, the technician knows that the substituted local telephone number is probably not a number that others may dial to call the caller. In some cases the substituted local telephone number may actually be a callable local number, depending on how service provider 170 treated it in their network. But typically the call-takers are trained to consider it unusable, because they know the number in the alternate number field is a number that they and others may dial to call the caller.

The present invention may be embodied as systems, methods, and/or computer program products. Accordingly, the present invention may be embodied in hardware and/or in software (including firmware, resident software, micro-code, etc). Furthermore, embodiments of the present invention may comprise a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device. Furthermore, the computer-readable medium may include, for example, the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium may be a program that can be electronically captured, via, for instance, optical scanning of the paper or other tangible medium, then compiled, interpreted, or otherwise processed in a suitable manner, if necessary, and then stored in a computer memory. The aforementioned are exemplary, and the computer-usable or computer-readable medium may comprise other elements.

Furthermore, the invention may be practiced in an electrical circuit comprising discrete electronic elements, packaged or integrated electronic chips containing logic gates, a circuit utilizing a microprocessor, or on a single chip containing electronic elements or microprocessors. The invention may also be practiced using other technologies capable of performing logical operations such as, for example, AND, OR, and NOT, including but not limited to mechanical, optical, fluidic, and quantum technologies. In addition, the invention may be practiced within a general purpose computer or in any other circuits or systems.

Embodiments of the present invention are described above with reference to block diagrams and/or operational illustrations of methods, systems, and computer program products according to embodiments of the invention. Functions/acts noted in the blocks, for example, may occur out of the order noted in the operational illustrations. For example, two blocks shown in succession may in fact be executed substantially concurrently or the blocks may sometimes be executed in the reverse order, depending upon the functionality/acts involved.

It is intended, therefore, that the specification and examples be considered as exemplary only, with a true scope and spirit of the invention being indicated by the following claims and their full scope of equivalents.

What is claimed is:

1. A method for providing foreign call back number compatibility, the method comprising:
   assigning a non-local telephone number to a subscriber;
   assigning a local telephone number to a subscriber, wherein the subscriber is a voice-over-internet-protocol subscriber; and
   providing periodically both to an automatic location information database the non-local telephone number and the local telephone number associated with the subscriber, wherein the local telephone number is provided from a local telephone number database in a packet switched routing apparatus.

2. The method of claim 1, wherein assigning the local telephone number further comprises assigning the local telephone number to the subscriber comprising a voice-over-internet-protocol subscriber.

3. The method of claim 1, wherein assigning the local telephone number further comprises assigning the local telephone number configured to identify a geographic location of the subscriber.

4. The method of claim 1, wherein assigning the non-local telephone number further comprises assigning the non-local telephone number configured not to identify a geographic location of the subscriber.

5. The method of claim 1, wherein providing periodically further comprises providing periodically to an automatic location information database.

6. A computer-readable medium wherein the medium is a computer memory which stores a set of instructions which when executed performs a method for providing a foreign call back number compatibility database, the method comprising:
   assigning a non-local telephone number to a subscriber;
   assigning a local telephone number to a subscriber, wherein the subscriber is a voice-over-internet-protocol subscriber; and
   providing periodically both to an automatic location information database the non-local telephone number and the local telephone number associated with the subscriber, wherein the local telephone number is provided from a local telephone number database in a packet switched routing apparatus.

7. The computer-readable medium of claim 6, wherein assigning the local telephone number further comprises assigning the local telephone number to the subscriber comprising a voice-over-internet-protocol subscriber.

8. The computer-readable medium of claim 6, wherein assigning the local telephone number further comprises assigning the local telephone number configured to identify a geographic location of the subscriber.

9. The computer-readable medium of claim 6, wherein assigning the non-local telephone number further comprises assigning the non-local telephone number configured not to identify a geographic location of the subscriber.

10. The computer-readable medium of claim 6, wherein providing periodically further comprises providing periodically to an automatic location information database.

11. A method for providing foreign call back number compatibility, the method comprising:
receiving a local telephone number assigned to a subscriber, wherein the subscriber is a voice-over-internet-protocol subscriber, the subscriber having a non-local telephone number as the normal calling number of the subscriber;
querying an automatic location information database with the local telephone number to obtain the non-local telephone number, wherein the local telephone number is provided from a local telephone number database in a packet switched routing apparatus; and
providing the non-local telephone number.

12. The method of claim 11, wherein receiving the local telephone number assigned to the subscriber further comprises receiving the local telephone number assigned to the subscriber comprising a voice-over-internet-protocol subscriber.

13. The method of claim 11, wherein receiving the local telephone number further comprises receiving the local telephone number configured to identify a geographic location of the subscriber.

14. The method of claim 11, wherein receiving the local telephone number assigned to the subscriber, the subscriber having a non-local telephone number as the normal calling number of the subscriber, further comprises the non-local telephone number configured not to identify a geographic location of the subscriber.

15. A method for providing foreign call back number compatibility, the method comprising:
receiving a local telephone number assigned to a subscriber, wherein the subscriber is a voice-over-internet-protocol subscriber, the subscriber having a non-local telephone number as the normal calling number of the subscriber;
querying a database with the local telephone number to obtain the non-local telephone number from a remote call-forwarding field in the database, wherein the local telephone number is provided from a local telephone number database in a packet switched routing apparatus; and
providing the non-local telephone number.

16. A system for providing foreign call back number compatibility, the system comprising:
means for receiving a local telephone number assigned to a subscriber, wherein the subscriber is a voice-over-internet-protocol subscriber, the subscriber having a non-local telephone number as the normal calling number of the subscriber;
means for querying a database comprising an automatic location information database with the local telephone number to obtain the non-local telephone number; and
means for providing the non-local telephone number which is periodically stored at the automatic location information database.

17. The system of claim 16, wherein the means for receiving the local telephone number assigned to the subscriber further comprises the means for receiving the local telephone number assigned to the subscriber comprising a voice-over-internet-protocol subscriber.

18. The system of claim 16, wherein the means for receiving the local telephone number further comprises the means for receiving the local telephone number configured to identify a geographic location of the subscriber.

19. The system of claim 16, wherein the means for receiving the local telephone number assigned to the subscriber, the subscriber having a non-local telephone number as the normal calling number of the subscriber, further comprises the non-local telephone number configured not to identify a geographic location of the subscriber.

20. The system of claim 16, wherein the means for querying the database further comprises the means for querying the database comprising an automatic location information database.

21. The system of claim 16, wherein the means for querying the database with the local telephone number to obtain the non-local telephone number further comprises the means for querying the database with the local telephone number to obtain the non-local telephone number from a remote call-forwarding field in the database.

22. A computer-readable medium wherein the medium is a computer memory which stores a set of instructions which when executed performs a method for providing a foreign call back number compatibility database, the method comprising:
receiving a local telephone number assigned to a subscriber, the subscriber having a non-local telephone number as the normal calling number of the subscriber and wherein the subscriber is a voice-over-internet-protocol subscriber;
querying an automatic location information database with the local telephone number to obtain the non-local telephone number, wherein the local telephone number resides at a local telephone number database in a packet switched routing apparatus; and
providing the non-local telephone number.

23. The computer-readable medium of claim 22, wherein receiving the local telephone number assigned to the subscriber further comprises receiving the local telephone number assigned to the subscriber comprising a voice-over-internet-protocol subscriber.

24. The computer-readable medium of claim 22, wherein receiving the local telephone number further comprises receiving the local telephone number configured to identify a geographic location of the subscriber.

25. The computer-readable medium of claim 22, wherein receiving the local telephone number assigned to the subscriber, the subscriber having a non-local telephone number as the normal calling number of the subscriber, further comprises the non-local telephone number configured not to identify a geographic location of the subscriber.

26. The computer-readable medium of claim 22, wherein querying the database further comprises querying the database comprising an automatic location information database.

27. The computer-readable medium of claim 22, wherein querying the database with the local telephone number to obtain the non-local telephone number further comprises querying the database with the local telephone number to obtain the non-local telephone number from a remote call-forwarding field in the database.

28. A method for providing foreign call back number compatibility, the method comprising:
maintaining a database comprising a plurality of local telephone numbers;

associating a one of the plurality of local telephone numbers with a subscriber having a non-local telephone number as a normal calling number wherein the subscriber is a voice-over-internet-protocol subscriber; and providing periodically to an automatic location information database the non-local telephone number and the one of the plurality of local telephone numbers associated with the subscriber.

29. The method of claim 28, wherein associating the one of the plurality of local telephone numbers with the subscriber further comprises associating the one of the plurality of local telephone numbers with the subscriber comprising a voice-over-internet-protocol subscriber.

30. The method of claim 28, wherein associating the one of the plurality of local telephone numbers further comprises associating the one of the plurality of local telephone numbers configured to identify a geographic location of the subscriber.

31. The method of claim 28, wherein associating the one of the plurality of local telephone numbers with the subscriber having the non-local telephone further comprises the non-local telephone number configured not to identify a geographic location of the subscriber.

32. The method of claim 28, wherein providing periodically further comprises providing periodically to an automatic location information database.

* * * * *

UNITED STATES PATENT AND TRADEMARK OFFICE
CERTIFICATE OF CORRECTION

| | | |
|---|---|---|
| PATENT NO. | : 7,756,253 B2 | Page 1 of 1 |
| APPLICATION NO. | : 11/222068 | |
| DATED | : July 13, 2010 | |
| INVENTOR(S) | : Thomas P. Breen and Anne-Marie B. Darr | |

It is certified that error appears in the above-identified patent and that said Letters Patent is hereby corrected as shown below:

On the title page, item [73] assignee should read --AT&T Intellectual Property I, LP, Atlanta, GA (US)--.

Signed and Sealed this
Nineteenth Day of July, 2011

David J. Kappos
*Director of the United States Patent and Trademark Office*